(12) United States Patent
Lewis

(10) Patent No.: US 8,371,122 B2
(45) Date of Patent: Feb. 12, 2013

(54) GEOTHERMAL POWER GENERATION SYSTEM AND METHOD OF MAKING POWER USING THE SYSTEM

(75) Inventor: William E. Lewis, Gooding, ID (US)

(73) Assignee: Power Engineers, Inc., Hailey, ID (US)

( * ) Notice: Subject to any disclaimer, the term of this patent is extended or adjusted under 35 U.S.C. 154(b) by 881 days.

(21) Appl. No.: 12/473,139

(22) Filed: May 27, 2009

(65) Prior Publication Data
US 2010/0300091 A1   Dec. 2, 2010

(51) Int. Cl.
*F01K 27/00*   (2006.01)
*F03G 7/00*   (2006.01)

(52) U.S. Cl. ..................... 60/641.5; 60/641.2

(58) Field of Classification Search ....... 60/641.2–641.5
See application file for complete search history.

(56) References Cited

U.S. PATENT DOCUMENTS

| | | | |
|---|---|---|---|
| 4,357,801 A | 11/1982 | Wahl, III | |
| 4,428,200 A * | 1/1984 | McCabe et al. | 60/641.5 |
| 4,429,535 A * | 2/1984 | Featherstone | 60/641.5 |
| 4,489,561 A | 12/1984 | Spevack | |
| 4,530,211 A | 7/1985 | Spevack | |
| 4,774,066 A | 9/1988 | Spevack | |
| 4,930,316 A | 6/1990 | Bonham, Jr. | |
| 4,967,559 A | 11/1990 | Johnston | |
| 5,526,646 A | 6/1996 | Bronicki et al. | |
| 5,582,011 A | 12/1996 | Bronicki et al. | |
| 5,598,706 A * | 2/1997 | Bronicki et al. | 60/641.2 |
| 5,622,632 A | 4/1997 | Gallup | |
| 5,671,601 A * | 9/1997 | Bronicki et al. | 60/641.5 |
| 5,809,782 A | 9/1998 | Bronicki et al. | |

OTHER PUBLICATIONS

European Search Report issued in corresponding EP Application No. 10155371.7-2315 dated Jun. 11, 2010.
Vorum, Martin, et al., Comparative Analysis of Alternative Means for Removing Noncondensable Gases from Flashed-Steam Geothermal Power Plants, Subcontractor Report, Jun. 2000, NREL/SR-550-28329, National Renewable Energy Laboratory, Golden, Colorado.

* cited by examiner

Primary Examiner — Hoang Nguyen
(74) Attorney, Agent, or Firm — Parsons Behle & Latimer

(57) ABSTRACT

The present disclosure is directed to geothermal power generation systems. The systems can comprise a first separator is in fluid communication with the geothermal fluid source, the first separator having a high pressure steam outlet and a liquid fraction outlet. A high pressure turbine is in fluid communication with the high pressure steam outlet and is coupled to a first power generator. A high pressure condenser is in fluid communication with the high pressure turbine. A low pressure separator is in fluid communication with the liquid fraction outlet of the first separator, the low pressure separator being capable of separating steam from the liquid fraction outflow and providing low pressure steam through a low pressure steam conduit. A low pressure turbine is in fluid communication with the low pressure steam conduit, the low pressure turbine being coupled to a second power generator. A main condenser is in fluid communication with the low pressure turbine. Methods for generating geothermal power are also discussed.

25 Claims, 5 Drawing Sheets

GEOTHERMAL POWER GENERATION SYSTEM AND METHOD OF MAKING POWER USING THE SYSTEM

BACKGROUND

1. Field of the Disclosure

The present disclosure relates generally to a system for generating power using a geothermal heat source and to a method of making geothermal power using the system.

2. Description of the Related Art

Some geothermal reservoirs have relatively high concentrations of non-condensable gases (NCG), such as carbon dioxide. NCG are generally considered undesirable because they increase cost and reduce efficiency of geothermal power plants.

Geothermal power plants generally employ condensers for condensing steam flow exhausted from turbines. The turbines are coupled to power generators used for producing electrical power. It is well known that, in general, lower condenser operating pressures result in more efficient power generation. However, the presence of relatively high concentrations of non-condensable gases in the steam can make it difficult to achieve desired low operating pressures, thereby decreasing efficiency. In addition, high concentrations of NCG mean that larger condensers and higher capacity vacuum equipment can be required to handle and remove the non-condensable gases, which results in increased capital costs for building geothermal power plants.

For steam turbine type geothermal power plants, there are essentially two main approaches for handling NCG, in addition to other approaches that are variations of these two approaches. A common approach, hereinafter referred to as the "standard" method, is to have a backend removal system that uses a compression system to remove the non-condensable gases from the vacuum condenser and compress them to slightly over atmospheric pressure prior to venting or treatment. This back-end NCG system typically consists of steam jet ejectors and/or vacuum pumps or turbocompressors. This is a good solution for reservoirs with low NCG content. However, for relatively high NCG content geothermal sources, this approach uses a large amount of steam for the jets or steam driven turbocompressor. In addition, the vacuum pumps and/or electric turbocompressors use large amounts of power.

The second method uses a "reboiler" device upstream of the steam turbine, which condenses the steam on one side of an exchanger and reboils it on the other side at a lower pressure. This creates a temperature driving force that powers the equipment. The non-condensable gases are vented from the upstream side of the reboiler and the lower pressure steam is sent to the turbine. Theoretically, this type of approach should work well. It has been tried experimentally, but there has been conflicting data as to how well it works in large scale geothermal power plants. Issues with this design may potentially include the loss of high pressure steam from the vent and the loss of steam pressure across the reboiler.

Other related methods and systems that are well known in the art are disclosed in an NREL report entitled "Comparative Analysis of Alternative Means of Removing Noncondensable Gases from Flashed-Steam Geothermal Power Plants," Report No. NREL/SR-550-28329 (June 2000), available online at nrel.gov/analysis/tech_geo_analysis.html.

The present disclosure is directed to overcoming, or at least reducing the effects of, one or more of the issues set forth above.

SUMMARY

An embodiment of the present disclosure is directed to a geothermal power generation system. The power generation system comprises a geothermal fluid source capable of producing a fluid comprising steam and at least one non-condensable gas. A first separator is in fluid communication with the geothermal fluid source, the first separator having a high pressure steam outlet and a liquid fraction outlet. The first separator is capable of producing from the fluid a high pressure steam outflow through the high pressure steam outlet and a liquid fraction outflow through the liquid fraction outlet. A high pressure turbine is in fluid communication with the high pressure steam outlet and is coupled to a first power generator. A high pressure condenser is in fluid communication with the high pressure turbine, the high pressure condenser being capable of condensing steam to form a condensate, separating the at least one non-condensable gas from the condensate and venting the non-condensable gas through an NCG outlet. A low pressure separator is in fluid communication with the liquid fraction outlet of the first separator, the low pressure separator being capable of separating steam from the liquid fraction outflow and providing low pressure steam through a low pressure steam conduit. A low pressure turbine is in fluid communication with the low pressure steam conduit, the low pressure turbine being coupled to a second power generator. A main condenser is in fluid communication with the low pressure turbine.

Another embodiment of the present disclosure is directed to a method for generating geothermal power. The method comprises providing a fluid capable of producing steam and at least one non-condensable gas from a geothermal source. Steam is separated from the fluid to form a high pressure steam outflow and a liquid fraction outflow, the steam outflow comprising a majority of the non-condensable gas from the fluid. A high pressure turbine is powered using the high pressure steam outflow to generate power using a power generator that is coupled to the high pressure turbine. High pressure steam is exhausted from the high pressure turbine to form a high pressure turbine exhaust. The high pressure turbine exhaust is flowed to a high pressure condenser. The high pressure condenser condenses the steam to form a condensate. A majority of the at least one non-condensable gas is separated from the condensate and the separated non-condensable gas is flowed out from the condenser. The liquid fraction outflow is separated to provide a low pressure steam flow and a low pressure liquid fraction flow using a low pressure separator. The low pressure steam is flowed to a low pressure turbine coupled to an electrical power generator to generate electrical power. Exhaust steam from the low pressure turbine is flowed to a main condenser, where the exhaust steam is condensed.

DETAILED DESCRIPTION

Figure 1:
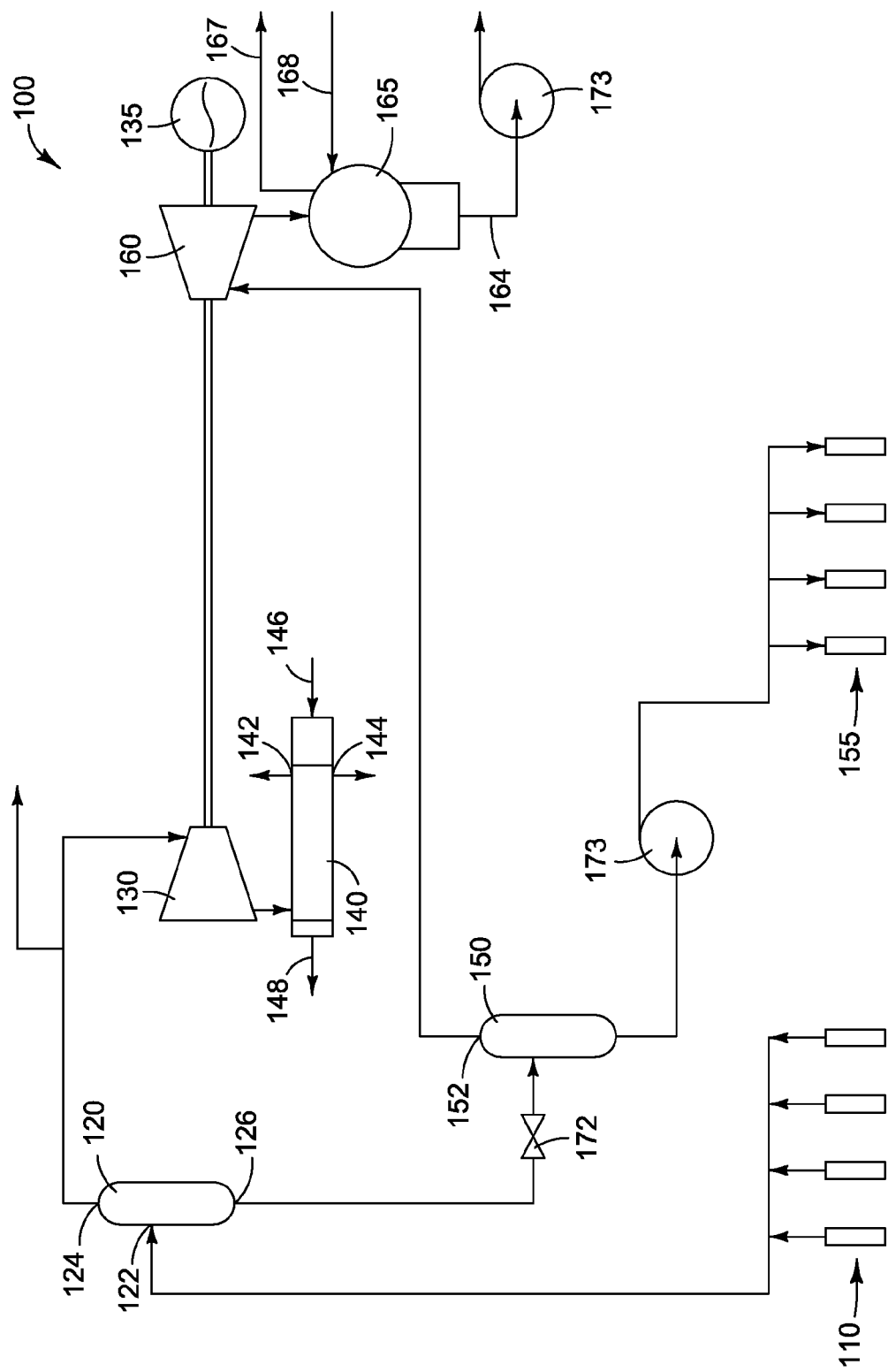
FIG. 1 illustrates a flow diagram of a geothermal power generation system in which exhaust pressures from a high pressure turbine can be at a relatively low pressure, according to an embodiment of the present disclosure.

FIG. 1 illustrates a flow diagram of a geothermal power generation system 100, according to an embodiment of the present disclosure. Geothermal power generation system 100 includes a geothermal fluid source 110, such as a geothermal production well, that produces a fluid heated to a temperature sufficient to produce steam and at least one non-condensable gas. The fluid produced by the geothermal steam source may comprise a two phase gas and liquid system. For example, the fluid can comprise a high temperature steam and noncondensable gas portion and a liquid brine portion.

Examples of non-condensable gases include carbon dioxide, hydrogen sulfide, ammonia and boric acid. In an embodiment, the majority of the noncondensable gas is carbon dioxide. The systems of the present disclosure can be used to process any range of noncondensable gas concentrations in a liquid dominated reservoir. For example, the system can be used to process geothermal source fluids having about 2 to over 20 weight percent steam in the high pressure steam fraction.

Referring to FIG. 1, a high pressure separator 120 is in fluid communication with the geothermal source 110. Any suitable high pressure separator that will function to separate steam from the brine can be employed. Separator 120 includes a high pressure steam outlet 124 and a brine outlet 126. Brine from the geothermal source 110 flows into the separator 120 through inlet 122 and exits at brine outlet 126. High pressure steam separated from the brine exits the separator through high pressure steam outlet 124.

In an embodiment, separator 120 is a flash separator, examples of which are well known in the art. The pressure selected for a high pressure flash separation can be higher than would be anticipated for a standard dual flash plant. The relatively high flash separation pressure allows for increased brine containing relatively low concentrations of NCG to be available for the low pressure flash, discussed in greater detail below. The precise high pressure separation pressure chosen depends on the resource conditions and the thermodynamics of the system. Exemplary high pressure separation pressures range from about 100 psia to about 160 psia, although pressures outside of this range can also be employed.

The high pressure steam can flow to a high pressure turbine 130 in fluid communication with the high pressure steam outlet 124. High pressure turbine 130 can be coupled to a power generator 135 for generating electrical power. The high pressure steam powers the high pressure turbine 130, which in turn provides the motive force for running the power generator 135.

Steam can be exhausted from the high pressure turbine 130 at a pressure greater than atmospheric pressure. The specific pressures selected for the high pressure turbine exhaust may depend on, among other things, the techniques used to process the NCG and the thermodynamics of the system.

FIGS. 1 to 3B show examples of various system flows that may employ different high pressure turbine exhaust pressures, according to embodiments of the present disclosure. In general, the system of FIG. 1 will employ lower exhaust pressures than the systems of FIGS. 2A to 3B; and the system of FIGS. 2A and 2B will employ an intermediate exhaust pressure that is generally lower than the exhaust pressures used in the systems of FIGS. 3A and 3B, but higher than the exhaust pressure used in the system of FIG. 1. The systems of FIGS. 3A and 3B employ similar exhaust pressures, which are generally higher than the pressures employed in the systems of FIGS. 1, 2A and 2B. The systems of FIGS. 2A to 3B will be discussed in greater detail below.

Continuing with the embodiment of FIG. 1, the exhaust pressure from the high pressure turbine 130 can be any suitable temperature greater than 1 atmosphere. For example, pressures can range from slightly greater than about 1 atm to about 3 atm. In an embodiment, the pressures can be in the lower end of this range, such as, for example, about 1 atm to about 2 atm. Pressures outside of these ranges can also be employed.

The steam exhausted from high pressure turbine 130 flows to a high pressure condenser 140. High pressure condenser 140 is capable of condensing steam to form a condensate and separating the at least one non-condensable gas from the condensate. The non-condensable gas can be vented through a NCG outlet 142. The condensate can flow from the high pressure condenser through outlet 144.

High pressure condenser 140 can employ a cooling fluid, as is well known in the art. A cooling fluid inlet 146 and outlet 148 for high pressure condenser 140 are shown in FIG. 1. Any suitable type of cooling fluid that will function to sufficiently cool the exhaust from the turbine to provide the desired condensation can be employed. Examples of suitable cooling fluids include water and air, as is well known in the art.

After the condensate is separated from the at least one non-condensable gas, the condensate fraction can be used for any suitable purpose, such as for cooling tower makeup, or alternatively can be re-injected back into the ground. The non-condensable gases can be vented from the condenser and/or treated in any desired manner. In an embodiment, the non-condensable gas can be vented directly into the atmosphere. In other embodiments, the non-condensable gas can be treated to satisfy local laws, taken to a sequestration process or re-injected into the earth.

Geothermal power generation system 100 can further include a low pressure separator 150 in fluid communication with the brine outlet 126 of the high pressure separator 120. Low pressure separator 150 functions to separate low pressure steam from the brine. A flash valve 172 can be positioned between the high pressure separator 120 and the low pressure separator 150 in order to generate low pressure steam from the brine fraction.

The liquid fraction from the low pressure separator 150 can be pumped into injection wells 155 using a pump 173, as is well known in the art. In an embodiment, the liquid fraction can be mixed with cooled and/or diluted geothermal liquid prior to being introduced into the injection wells 155.

Low pressure separator 150 is capable of providing low pressure steam through a low pressure steam outlet 152 to a low pressure turbine 160. The low pressure turbine 160 is coupled to power generator 135. As illustrated in the embodiment of FIG. 1, both the low pressure turbine 160 and the high pressure turbine 130 can be coupled to the same power generator 135. In an alternative embodiment, multiple power generators can be used and low pressure turbine 160 can be coupled to a different power generator than high pressure turbine 130.

A main condenser 165 can be in fluid communication with the low pressure turbine 160. Main condenser 165 can condense the steam at pressures below 1 atmosphere. Examples of suitable main condenser pressures range from about 1.5" HgA to about 6" HgA, such as, for example, about 1.6 to 2.5" HgA. Pressures outside of these ranges can also be employed.

Any residual NCG that reaches main condenser 165 can be removed using a NCG condenser removal system that is relatively small compared to the size of the system that would otherwise be employed if the majority of NCG were removed using the main condenser 165, as in the standard method discussed above in the Background. Residual NCG are shown as being removed from main condenser 165 at outflow stream 167. Stream 168 is incoming cooling water. Stream 164 is the outflow of cooling water and steam condensate from the main condenser 165.

Because the majority of the non-condensable gases are removed using the high pressure condenser 140, one or more of the following benefits may be achieved with respect to the main condenser 165: a) the main condenser 165 can be small compared to the size of condenser that might typically be used in systems for which the majority of non-condensable gases are removed using the main condenser, thereby reducing costs of the overall system; b) the main condenser non-condensable gas removal system can use less steam compared to standard systems for which the majority of non-condensable gases are removed using the main condenser, given the same NCG concentrations in the production well brine; c) the main condenser can use smaller vacuum pumps compared to standard systems for which the majority of non-condensable gases are removed using the main condenser, given the same NCG concentrations in the production well brine; or d) the main condenser 165 can be operated at a lower pressure compared to the main condenser in a system for which the majority of non-condensable gases are removed using the main condenser, given the same NCG concentrations in the production well brine. As discussed above, operating the main condenser at a lower pressure can significantly increase power generation from the low pressure turbine 160 and power generator 135. As used herein, the term "majority" is defined as an amount greater than 50% by weight.

Any suitable type of condenser can be employed as the high pressure condenser 140 and the main condenser 165. In an embodiment, the high pressure condenser 140 is a tube and shell design and the main condenser 165 is a direct contact condenser. In another embodiment, both the high pressure condenser 140 and the main condenser 165 are tube and shell design. In another embodiment, both high pressure condenser 140 and the main condenser 165 are direct contact condensers.

Various percentages of the concentrations of NCG can be removed at each condenser, depending on such things as the system parameters and operating conditions. In an embodiment, about 90% by weight or more of the NCG can be removed by the high pressure condenser 140. Percentages of NCG outside of this range can also be removed by the high pressure condenser. The NCG not removed by the high pressure condenser can be removed by the main condenser.

Figure 2A:
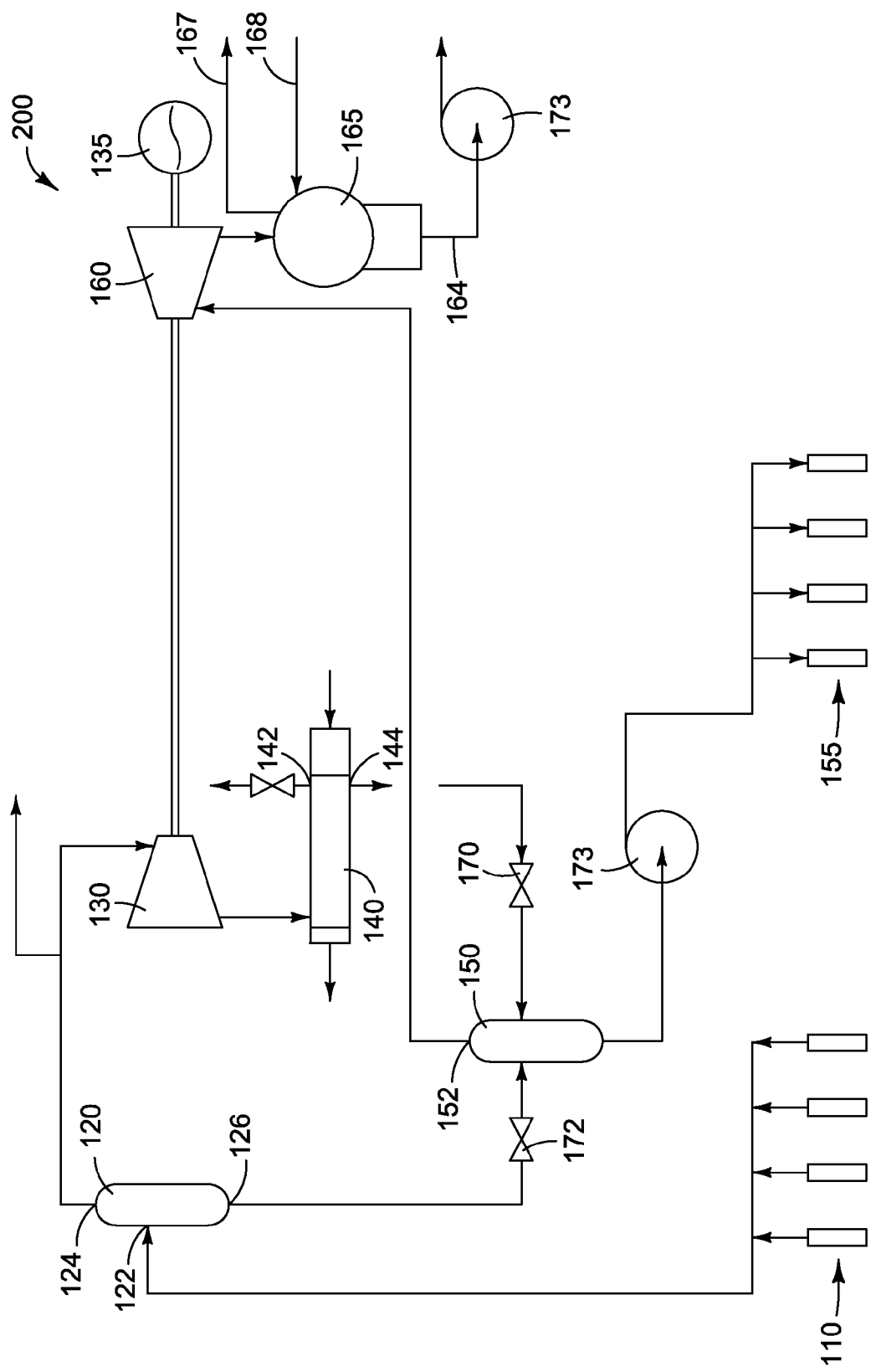
FIGS. 2A and 2B illustrate flow diagrams of geothermal power generation systems in which exhaust pressures from a high pressure turbine can be at an intermediate pressure, according to embodiments of the present disclosure.

FIG. 2A illustrates a flow diagram of a geothermal power generation system, according to another embodiment of the present disclosure. The embodiment of FIG. 2A is similar to the embodiment described above with respect to FIG. 1, except for the differences described below.

In the embodiment of FIG. 2A, the exhaust pressure from the high pressure turbine 130 can be at an intermediate pressure that is higher than in the embodiment of FIG. 1. Suitable intermediate exhaust pressures can range from, for example, about 28 to about 40 psia. Pressures outside of this range can also be employed.

Also in the embodiment of FIG. 2A, the condensate from the high pressure condenser is treated differently than in the embodiment of FIG. 1. After the NCG is removed, the condensate pressure can be reduced to produce low pressure steam that can be used to run the low pressure turbine 160. For example, a flash valve 170 can be positioned in fluid communication with both low pressure separator 150 and the high pressure condenser 140. This allows condensate to flow from the high pressure condenser 140 through the flash valve 170 to form low pressure steam. The steam from flash valve 170 is separated from a liquid fraction of the remaining condensate using the low pressure separator 150. The low pressure steam can then be directed to low pressure turbine 160 and used to generate power. Any suitable low pressure turbine steam inlet pressures can be employed. Low pressure turbine steam inlet pressures can range from about 14 to about 18 psia. Pressures outside of this range can also be employed.

Figure 2B:
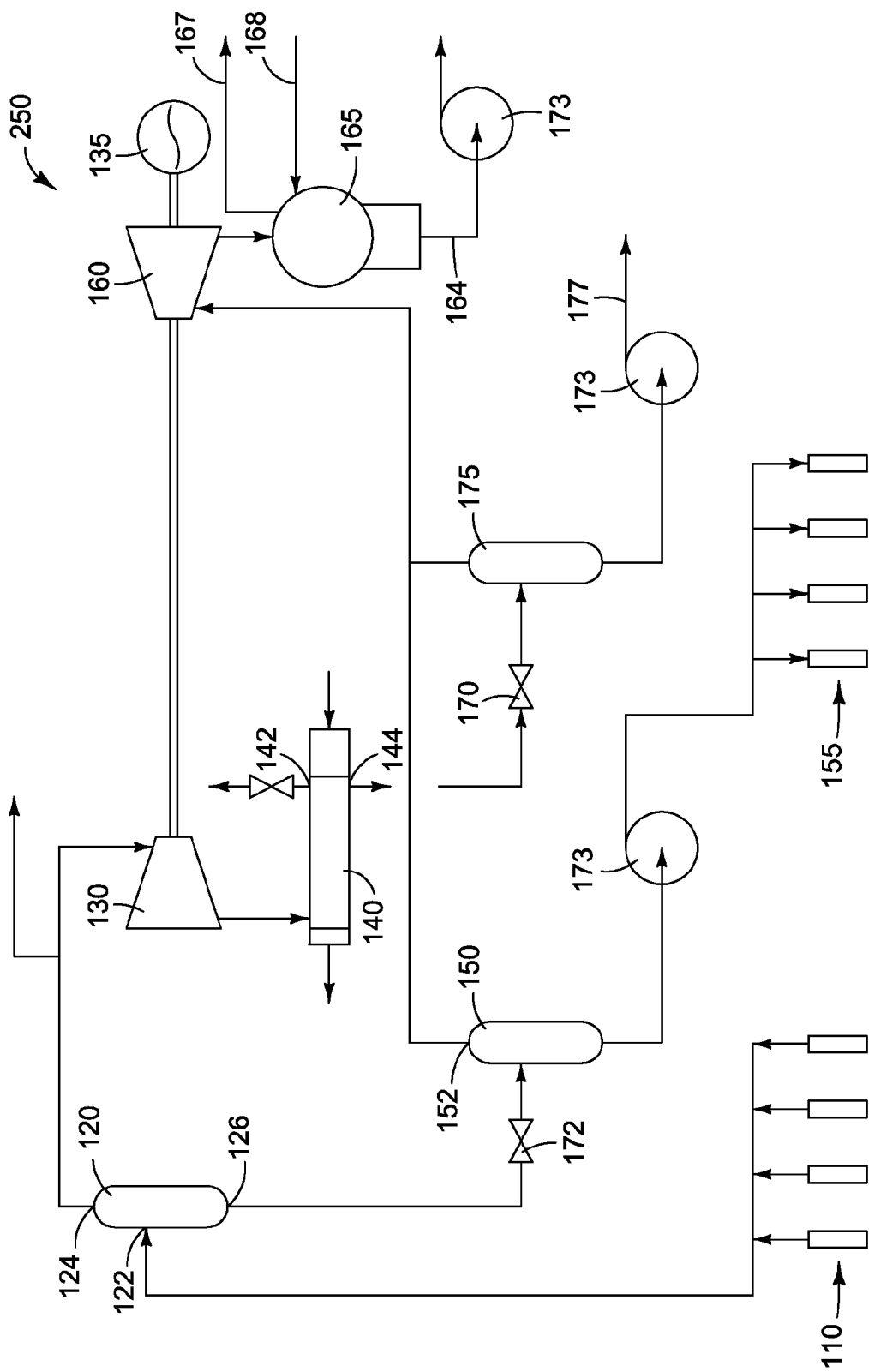

In an alternative embodiment shown in FIG. 2B, the steam from flash valve 170 can be separated from a liquid fraction of the remaining condensate using a second low pressure separator 175 other than the low pressure separator 150. Then low pressure steam from the second low pressure separator 175 can be used in low pressure turbine 160. In this alternative, the steam condensate 177 can be recovered as a source of clean water for the plant or cooling tower makeup, pumped into injection wells or used for any other desired purpose.

Figure 3A:
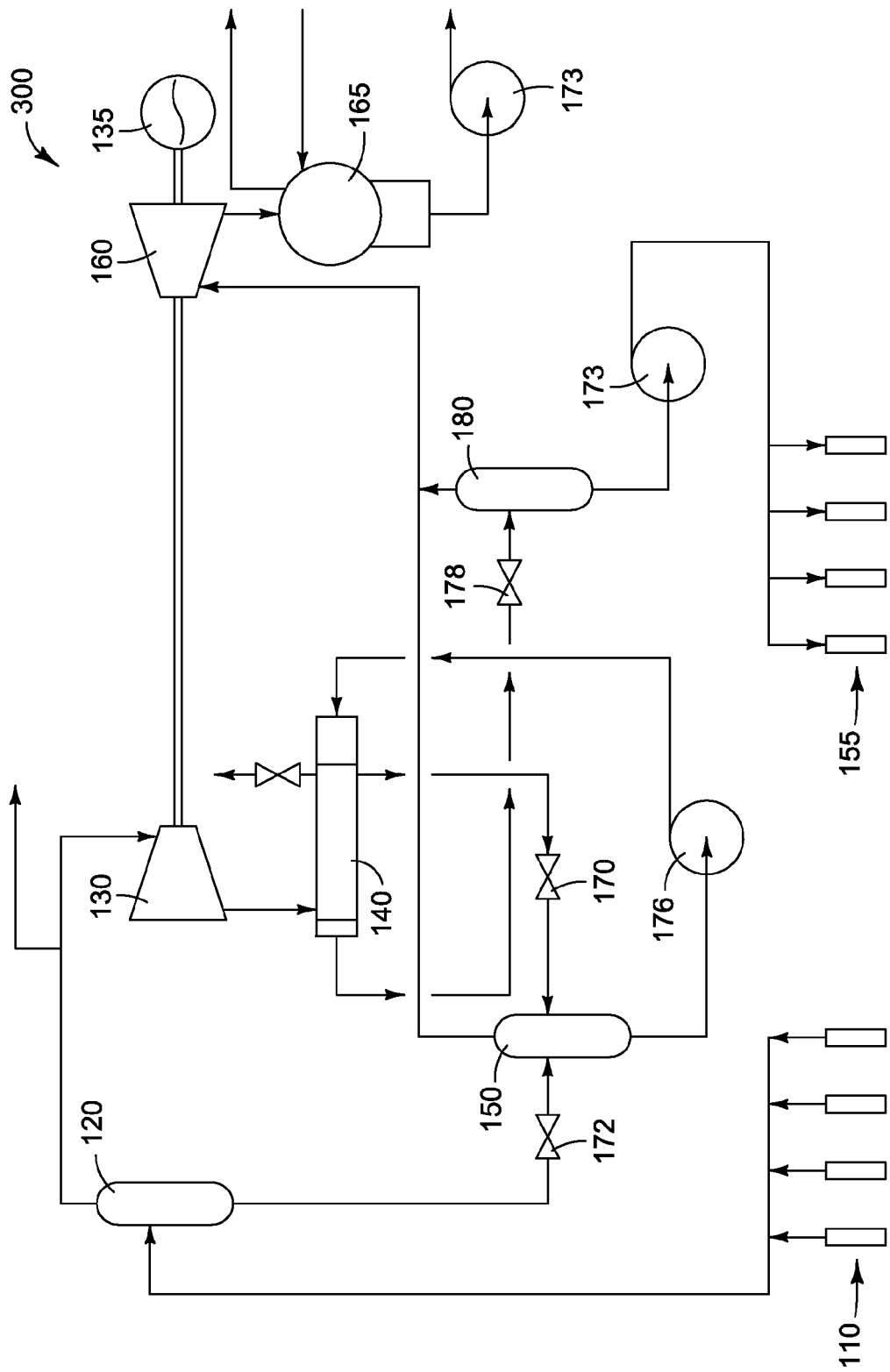
FIGS. 3A and 3B illustrate flow diagrams of geothermal power generation systems in which exhaust pressures from a high pressure turbine can be at a relatively high pressure, according to embodiments of the present disclosure.
Figure 3B:
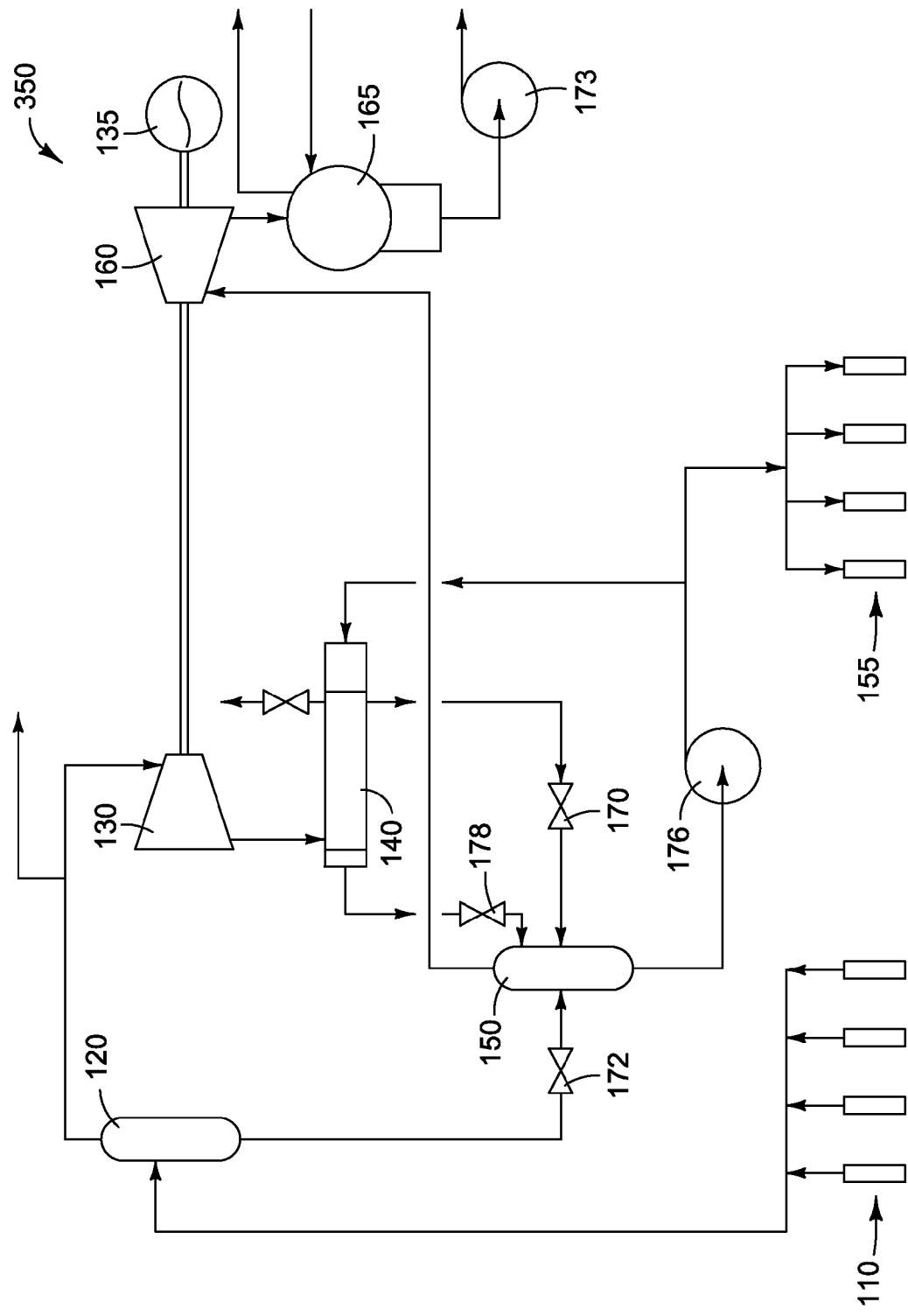

The embodiments of FIGS. 2A and 2B may result in less net power generation then the embodiments of FIGS. 3A and 3B. However, the embodiments of FIGS. 1, 2A and 2B may still be relatively simple and cost effective as compared to systems that are known in the art. Additionally, as discussed above, the NCG produced from the process of FIGS. 2A and 2B can potentially be supplied at some intermediate pressure, which may be desirable in some situations, such as for carbon dioxide recovery or utilization.

FIG. 3A illustrates a flow diagram of a geothermal power generation system 300, according to another embodiment of the present disclosure. The embodiment of FIG. 3A is similar to the embodiment described above with respect to FIG. 2A, except for the differences described below.

In the embodiment of FIG. 3A and 3B, the exhaust pressure from the high pressure turbine 130 can be at relatively high pressure compared to the embodiments of FIGS. 1 and 2. Suitable exhaust pressures can range from, for example, about 80 to about 110 psia. Pressures outside of this range can also be employed.

The embodiment of FIG. 3A can include a booster pump 176 in fluid communication with the second low pressure separator 150 and the high pressure condenser 140. Booster pump 176 functions to increase pressure of the liquid fraction coming from separator 150. The liquid fraction is then used as a coolant for high pressure condenser 140, which effectively adds heat to the liquid fraction to form a heated high pressure condenser outflow.

A flash valve 178 can be positioned in fluid communication with both a second low pressure separator 180 and the high pressure condenser 140 in a manner that allows the heated outflow from the high pressure condenser 140 to flow through the flash valve 178 to form a two phase mixture of low pressure steam and a liquid fraction prior to flowing to low pressure separator 180. In an embodiment, the pressure of the steam can be lowered by the flash valve 178 to substantially match the pressure of the low pressure steam from low pressure separator 150.

The steam from flash valve 178 is then separated from the liquid fraction in the low pressure separator 180. Steam from low pressure separator 180 then flows to low pressure turbine 160 to generate power.

The embodiment of FIG. 3A can have a higher gross and net power output than the embodiments of FIGS. 1, 2A and 2B. In embodiments, it can produce a high pressure NCG gas stream rich in carbon dioxide and low in water vapor that can then be treated, taken to a sequestration process, re-injected, or vented, as desired.

FIG. 3B illustrates an alternative geothermal power generation system 400 that is similar to the system of FIG. 3A, except that the flash valve 178 outlet flow goes to the first low pressure separator 150, thus eliminating low pressure separator 180. In this embodiment the total liquid flow can go through pump 176, with the outflow from pump 176 being used in any suitable manner. For example, a portion of the flow from the pump 176 can be directed to the injection wells and a portion to the high pressure condenser to be used as cooling fluid.

Although various embodiments have been shown and described, the disclosure is not so limited and will be understood to include all such modifications and variations as would be apparent to one skilled in the art.

What is claimed is:

1. A geothermal power generation system, comprising:
    a geothermal fluid source capable of producing a fluid comprising steam and at least one non-condensable gas;
    a first separator in fluid communication with the geothermal fluid source, the first separator having a high pressure steam outlet and a liquid fraction outlet, the first separator being capable of producing from the fluid a high pressure steam outflow through the high pressure steam outlet and a liquid fraction outflow through the liquid fraction outlet;
    a high pressure turbine in fluid communication with the high pressure steam outlet, the high pressure turbine being coupled to a first power generator;
    a high pressure condenser in fluid communication with the high pressure turbine, the high pressure condenser being capable of condensing steam to form a condensate, separating the at least one non-condensable gas from the condensate and venting the non-condensable gas through an NCG outlet;
    a low pressure separator in fluid communication with the liquid fraction outlet of the first separator, the low pressure separator being capable of separating steam from the liquid fraction outflow and providing low pressure steam through a low pressure steam conduit;
    a low pressure turbine in fluid communication with the low pressure steam conduit, the low pressure turbine being coupled to a second power generator;
    a main condenser in fluid communication with the low pressure turbine;
    a second low pressure separator; and
    a flash valve in fluid communication with both the second low pressure separator and the high pressure condenser in a manner that allows condensate to flow from the high pressure condenser through the flash valve to form low pressure steam and a liquid fraction, the steam being separated from the liquid fraction using the second low pressure separator.

2. The system of claim 1, wherein the first power generator and the second power generator comprise a common power generator device.

3. The system of claim 1, wherein the at least one non-condensable gas is carbon dioxide.

4. The system of claim 1, wherein the first separator is a flash separator.

5. The system of claim 1, wherein the second low pressure separator is in fluid communication with the low pressure turbine so that the low pressure steam from the second low pressure separator is capable of powering the low pressure turbine.

6. The system of claim 5, wherein the first low pressure separator and the second low pressure separator comprise a common low pressure separator device.

7. The system of claim 5, further comprising a booster pump in fluid communication with the high pressure condenser and at least one of the first low pressure separator and the second low pressure separator in a manner that allows liquid fractions from the at least one first and second low pressure separators to flow into the high pressure condenser so as to cool the steam in the condenser, the liquid fractions being heated in the high pressure condenser to form a heated condenser outflow.

8. The system of claim 7, further comprising a second flash valve and a third low pressure separator, the second flash valve being in fluid communication with both the third low pressure separator and the high pressure condenser in a manner that allows the heated condenser outflow from the high pressure condenser to flow through the flash valve to form a second low pressure steam and a second liquid fraction, the second low pressure steam being separated from the second liquid fraction by the third low pressure separator.

9. The system of claim 8, wherein the third low pressure separator is in fluid communication with the low pressure turbine so that the low pressure steam from the third low pressure separator is capable of powering the low pressure turbine.

10. The system of claim 8, wherein the first low pressure separator and the third low pressure separator comprise a common low pressure separator device.

11. The system of claim 8, wherein the first low pressure separator, the second low pressure separator and the third low pressure separator comprise a common low pressure separator device.

12. A method for generating geothermal power, comprising:
    providing a fluid capable of producing steam and at least one non-condensable gas from a geothermal source;
    separating steam from the fluid to form a high pressure steam outflow and a liquid fraction outflow, the steam outflow comprising a majority of the non-condensable gas from the fluid;
    powering a high pressure turbine using the high pressure steam outflow to generate power using a power generator that is coupled to the high pressure turbine, the high pressure steam being exhausted from the high pressure turbine to form a high pressure turbine exhaust;
    flowing the high pressure turbine exhaust to a high pressure condenser, the high pressure condenser condensing the steam to form a condensate, separating a majority of the at least one non-condensable gas from the condensate and flowing the separated non-condensable gas out from the condenser;
    separating the liquid fraction outflow to provide a low pressure steam flow and a low pressure liquid fraction flow using a low pressure separator;
    flowing the low pressure steam to a low pressure turbine coupled to an electrical power generator to generate electrical power;

flowing exhaust steam from the low pressure turbine to a main condenser, the main condenser condensing the exhaust steam; and flowing the condensate from the high pressure condenser through a flash valve to form low pressure steam and a condensate liquid fraction.

13. The method of claim 12, wherein the at least one non-condensable gas is carbon dioxide.

14. The method of claim 12, wherein a high pressure flash separator is used to separate the fluid into a high pressure liquid fraction and high pressure steam, the flash separator being operated at a pressure ranging from about 100 psia to about 160 psia.

15. The method of claim 12, wherein the high pressure turbine exhaust has a pressure ranging from greater than 1 atm to about 3 atm.

16. The method of claim 15, wherein the non-condensable gas is vented into the atmosphere.

17. The method of claim 12, wherein the high pressure turbine exhaust has a pressure ranging from about 28 psia to about 40 psia.

18. The method of claim 12, further comprising separating the low pressure steam from the condensate liquid fraction and flowing the separated low pressure steam to the low pressure turbine.

19. The method of claim 18, further comprising flowing the condensate liquid fraction into one or more injection wells.

20. The method of claim 12, wherein the high pressure turbine exhaust has a pressure ranging from about 80 to about 110 psia.

21. The method of claim 18, further comprising flowing the separated condensate liquid fraction into the high pressure condenser to cool the high pressure steam in the condenser to form a heated condenser outflow.

22. The method of claim 20, further comprising flowing the heated condenser outflow from the high pressure condenser through a flash valve to form a second low pressure steam and a second liquid fraction.

23. The method of claim 22, further comprising separating the second low pressure steam from the second liquid fraction and flowing the separated second low pressure steam to the low pressure turbine.

24. The system of claim 1, further comprising a pump in fluid communication with the second low pressure separator, configured to pump the liquid fraction from the second low pressure separator as a source of clean water.

25. The method of claim 22, further comprising drawing off the second liquid fraction as a clean water source.

* * * * *